United States Patent
Ranta

(10) Patent No.: US 9,184,525 B1
(45) Date of Patent: Nov. 10, 2015

(54) POWER DISTRIBUTION SYSTEM AND CONTACT RETENTION ASSEMBLY THEREFOR

(71) Applicant: EATON CORPORATION, Cleveland, OH (US)

(72) Inventor: Michael John Ranta, Morton, IL (US)

(73) Assignee: EATON CORPORATION, Cleveland, OH (US)

( * ) Notice: Subject to any disclaimer, the term of this patent is extended or adjusted under 35 U.S.C. 154(b) by 58 days.

(21) Appl. No.: 14/295,490

(22) Filed: Jun. 4, 2014

(51) Int. Cl.
| H02B 1/04 | (2006.01) |
| H01R 13/11 | (2006.01) |
| H01R 13/115 | (2006.01) |
| H01R 13/20 | (2006.01) |
| H02B 1/24 | (2006.01) |

(52) U.S. Cl.
CPC ............ *H01R 13/113* (2013.01); *H01R 13/115* (2013.01); *H01R 13/20* (2013.01); *H02B 1/24* (2013.01)

(58) Field of Classification Search
CPC ........ H01R 13/115; H01R 13/20; H02B 1/24; H01H 71/88; H01H 1/14; H01H 1/50; H01H 1/221
See application file for complete search history.

(56) References Cited

U.S. PATENT DOCUMENTS

| 2,922,004 | A | * | 1/1960 | Miller | H01H 71/08 200/250 |
| 3,144,588 | A | * | 8/1964 | Platz | H01H 1/58 361/634 |
| 3,950,071 | A | * | 4/1976 | McGann | H02B 1/056 439/221 |
| 4,016,386 | A | * | 4/1977 | Gelzheiser | H01H 71/08 200/250 |
| 4,473,269 | A | * | 9/1984 | Belttary | H01R 4/4818 439/839 |
| 5,375,036 | A | | 12/1994 | Magdaleno | |
| 6,323,448 | B1 | * | 11/2001 | Seymour | H01H 71/08 200/237 |
| 6,743,542 | B2 | * | 6/2004 | Krasij | H01M 8/0271 429/465 |
| 7,510,448 | B2 | * | 3/2009 | Eppe | H01R 4/4836 439/729 |
| 7,553,175 | B1 | | 6/2009 | Benson et al. | |
| 8,035,047 | B2 | | 10/2011 | Raabe et al. | |
| 8,049,126 | B2 | * | 11/2011 | Chen | H01H 1/5866 200/244 |
| 8,395,885 | B2 | | 3/2013 | Maloney | |

FOREIGN PATENT DOCUMENTS

| KR | 100974483 B1 | 8/2010 |
| KR | 100979890 B1 | 9/2010 |

* cited by examiner

*Primary Examiner* — Gregory Thompson
(74) *Attorney, Agent, or Firm* — Eckert Seamans Cherin & Mellott, LLC; Grant E. Coffield

(57) ABSTRACT

A contact retention assembly is for electrically connecting an electrical apparatus to an electrical bus member. The contact retention assembly includes a bus stab, a spring member and a terminal contact. The bus stab includes first and second opposing sides, and at least one protrusion extending outwardly from a corresponding one of the first side and second sides. The spring member includes first and second opposing legs, an intermediate portion, and a number of openings. The terminal contact is electrically connected to the electrical apparatus, and is disposed between the bus stab and the spring member. The first and second legs of the spring member are biased toward one another to mechanically couple and electrically connect the terminal contact to the bus stab. The protrusion is disposed in a corresponding one of the openings of the spring member to retain the spring member on the bus stab.

20 Claims, 5 Drawing Sheets

POWER DISTRIBUTION SYSTEM AND CONTACT RETENTION ASSEMBLY THEREFOR

BACKGROUND

1. Field

The disclosed concept relates generally to power distribution systems and, more particularly, to power distribution systems employing a number of electrical apparatus. The disclosed concept also relates to contact retention assemblies for power distributions systems.

2. Background Information

Electrical apparatus, such as electrical switching apparatus or electrical meters used in power distribution systems, are often mounted on or within an electrical enclosure (e.g., without limitation, a panelboard; a load center; a meter breaker panel) either individually or in combination with other electrical meters or switchgear (e.g., without limitation, circuit switching devices and circuit interrupters such as circuit breakers, contactors, motor starters, motor controllers and other load controllers).

The electrical enclosure is typically coupled to and supported by a structure such as, for example, a wall of a building, and includes a number of electrical bus members. Electrical connector assemblies mechanically couple and electrically connect the electrical apparatus to corresponding electrical bus members. Known electrical connector assemblies typically include a clip member or a number of separate fasteners that are structured to mechanically couple the electrical apparatus to a contact stab of the desired electrical bus member. However, the use of separate fasteners is disadvantageous because it is time-consuming and requires separate tools. Moreover, space constraints within the interior of the electrical enclosure inhibit access to the fasteners, making it difficult to achieve proper mechanical and/or electrical connection between the electrical apparatus and its corresponding electrical bus member.

While known clip or spring members overcome some of the foregoing disadvantages concerning separate fasteners, they too suffer from their own unique set of difficulties. In particular, the retention force of the clip or spring member for retaining the clip or spring member on the contact stab and, therefore, maintaining the desired mechanical and electrical connections between the electrical bus member and the electrical apparatus, is less than desired. That is, relatively little force is required to overcome the retention force of the clip or spring member and disconnect the electrical connector assembly. This can lead to an unintentional disconnection and/or can inhibit electrical performance of the power distribution system.

There is, therefore, room for improvement in power distribution systems and in contact retention assemblies therefor.

SUMMARY

These needs and others are met by embodiments of the disclosed concept, which are directed to a contact retention assembly for power distribution systems.

As one aspect of the disclosed concept, a contact retention assembly is provided for electrically connecting an electrical apparatus to an electrical bus member. The contact retention assembly comprises: a bus stab structured to extend perpendicularly outwardly from the electrical bus member, the bus stab comprising a first side, a second side disposed opposite the first side, and at least one protrusion extending outwardly from a corresponding one of the first side and the second side; a spring member comprising a first leg, a second leg disposed opposite the first leg, an intermediate portion interconnecting the first leg and the second leg, and a number of openings; and a terminal contact structured to be electrically connected to the electrical apparatus, the terminal contact being disposed between the bus stab and the spring member. The first leg of the spring member and the second leg of the spring member are biased toward one another to mechanically couple and electrically connect the terminal contact to the bus stab. The protrusion of the bus stab is disposed in a corresponding one of the openings of the spring member to retain the spring member on the bus stab.

The protrusion may be a rounded dome extending outwardly from the first side of the bus stab, and the opening may be a hole extending through the first leg of the spring member, wherein the rounded dome is disposed in the hole. The hole may have a circumference, wherein an edge extends around the circumference and the edge is rounded or smooth.

The terminal contact may comprise a first portion and a second portion extending perpendicularly outwardly from the first portion. The second portion may be disposed between the second leg of the spring member and the second side of the bus stab.

As another aspect of the disclosed concept, a power distribution system comprises: a number of electrical bus members; a number of electrical apparatus; and at least one contact retention assembly for electrically connecting the electrical apparatus to the electrical bus members, each of the at least one contact retention assembly comprising: a bus stab extending perpendicularly outwardly from the electrical bus member and comprising a first side, a second side disposed opposite the first side, and at least one protrusion extending outwardly from a corresponding one of the first side and the second side, a spring member comprising a first leg, a second leg disposed opposite the first leg, an intermediate portion interconnecting the first leg and the second leg, and a number of openings, and a terminal contact electrically connected to the electrical apparatus and being disposed between the bus stab and the spring member. The first leg of the spring member and the second leg of the spring member are biased toward one another to mechanically couple and electrically connect the terminal contact to the bus stab. The protrusion of the bus stab is disposed in a corresponding one of the openings of the spring member to retain the spring member on the bus stab.

The bus stab may include a first protrusion and a second protrusion, and the bus stab may further comprise a first stab segment and a second stab segment spaced from the first stab segment, wherein the first protrusion extends outwardly from the first side of the bus stab on the first stab segment, and where the second protrusion extends outwardly from the second side of the bus stab on the second stab segment. The number of electrical apparatus may be a plurality of electrical switching apparatus, and the at least one contact retention assembly may be a plurality of contact retention assemblies. Each of the contact retention assemblies may electrically connect and mechanically couple a corresponding one of the electrical switching apparatus to a corresponding one of the first stab segment and the second stab segment.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
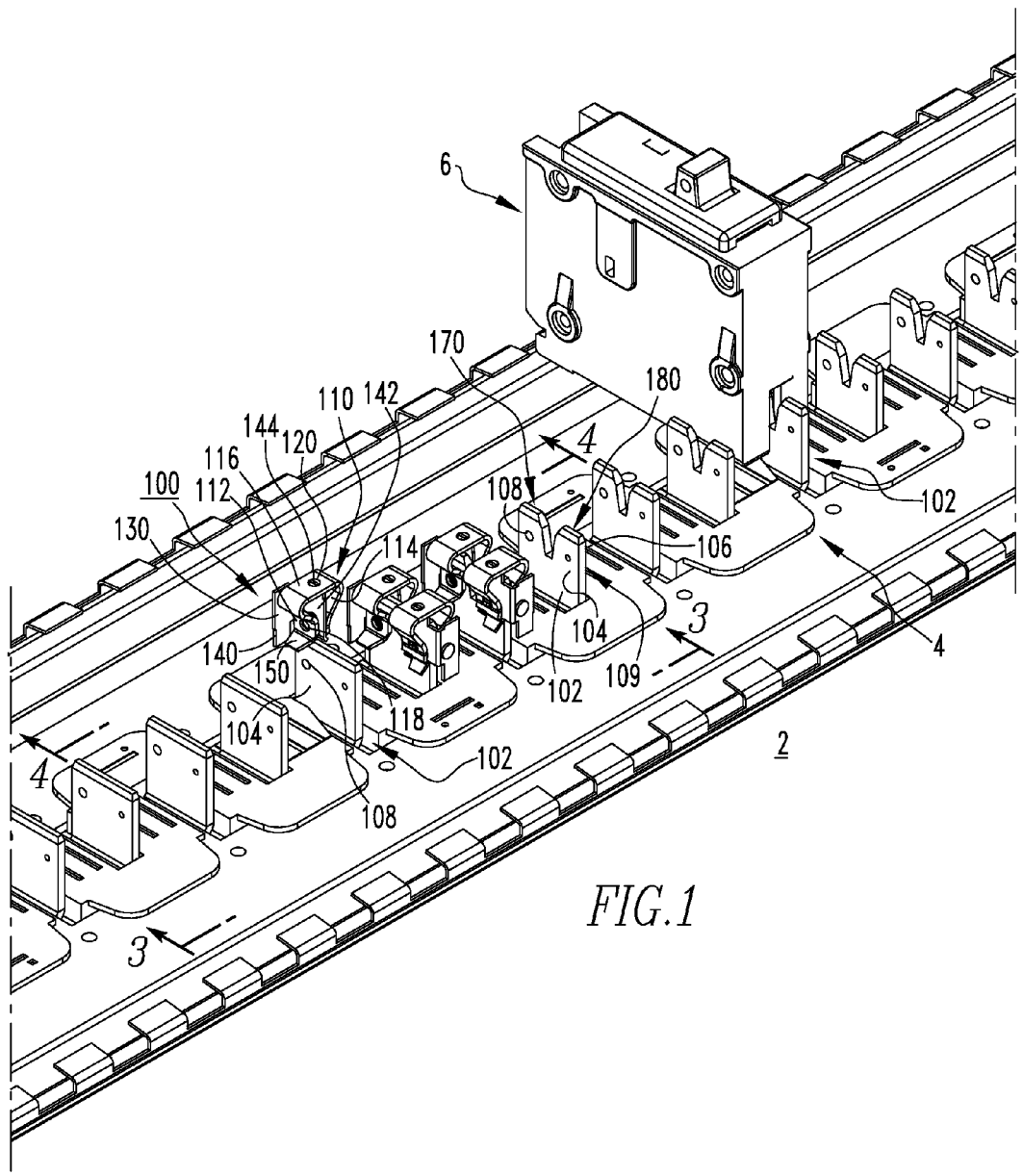
FIG. 1 is an isometric view of a portion of a power distribution system and a number of contact retention assemblies therefor, in accordance with an embodiment of the disclosed concept.

For purposes of illustration, embodiments of the disclosed concept will be described as applied to contact retention assemblies for retaining circuit breakers in a load center, although it will become apparent that they could also be applied to retain any known or suitable electrical apparatus (e.g., without limitation, electrical meters; circuit switching devices; circuit interrupters other than circuit breakers, such as contactors, motor starters, motor controllers and other load controllers) in power distribution systems other than load centers such as, for example and without limitation, panelboards and meter breaker panels.

Directional phrases used herein, such as, for example, right, left, upward, downward, inward, outward, above, below and derivatives thereof, relate to the orientation of the elements shown in the drawings and are not limiting upon the claims unless expressly recited therein.

As employed herein, the term "electrical bus" or "electrical bus member" refers to any known or suitable electrical conductor which carries or transfers voltage, current or power.

As employed herein, the term "bus stab" refers to a portion of the electrical bus member to which a terminal contact of a corresponding electrical apparatus (e.g., without limitation, an electrical switching apparatus; an electrical meter) is electrically connected.

As employed herein, the term "fastener" refers to any suitable connecting or tightening mechanism expressly including, but not limited to, rivets, screws, bolts and the combinations of bolts and nuts (e.g., without limitation, lock nuts) and bolts, washers and nuts.

As employed herein, the statement that two or more parts are "coupled" together shall mean that the parts are joined together either directly or joined through one or more intermediate parts.

As employed herein, the term "number" shall mean one or an integer greater than one (i.e., a plurality).

FIG. 1 shows a contact retention assembly 100 for electrically connecting an electrical apparatus, such as for example and without limitation, a circuit breaker 6, to an electrical bus member 4 in a power distribution system 2. In the example of FIG. 1, the power distribution system 2 is a load center (partially shown), which among other components, incorporates the aforementioned electrical bus member 4. The circuit breaker 6 is mechanically coupled and electrically connected to the electrical bus member 4 by way of the contact retention assembly 100, as described in greater detail hereinbelow. For simplicity of illustration and economy of disclosure, only one contact retention assembly 100 and one electrical apparatus (e.g., without limitation, circuit breaker 6) is shown and described herein, in detail. It will, however, be appreciated that any known or suitable number and/or configuration of circuit breakers (e.g., 6) or other suitable electrical apparatus (e.g., without limitation, electrical meters; circuit switching devices; circuit interrupters other than circuit breakers, such as contactors, motor starters, motor controller and other load controllers) (not shown) could be suitably mechanically coupled and electrically connected using any known or suitable combination of the disclosed contact retention assemblies (e.g., 100). It will further be appreciated that all of the other contact retention assemblies, which are shown but not specifically described in detail herein (for example, five contact retention assemblies 100 are shown in FIG. 1, and an additional contact retention assembly, which is hidden in FIG. 1, electrically connects and mechanically couples the circuit breaker 6 to the bus stab 102) are preferably substantially identical.

Figure 2:
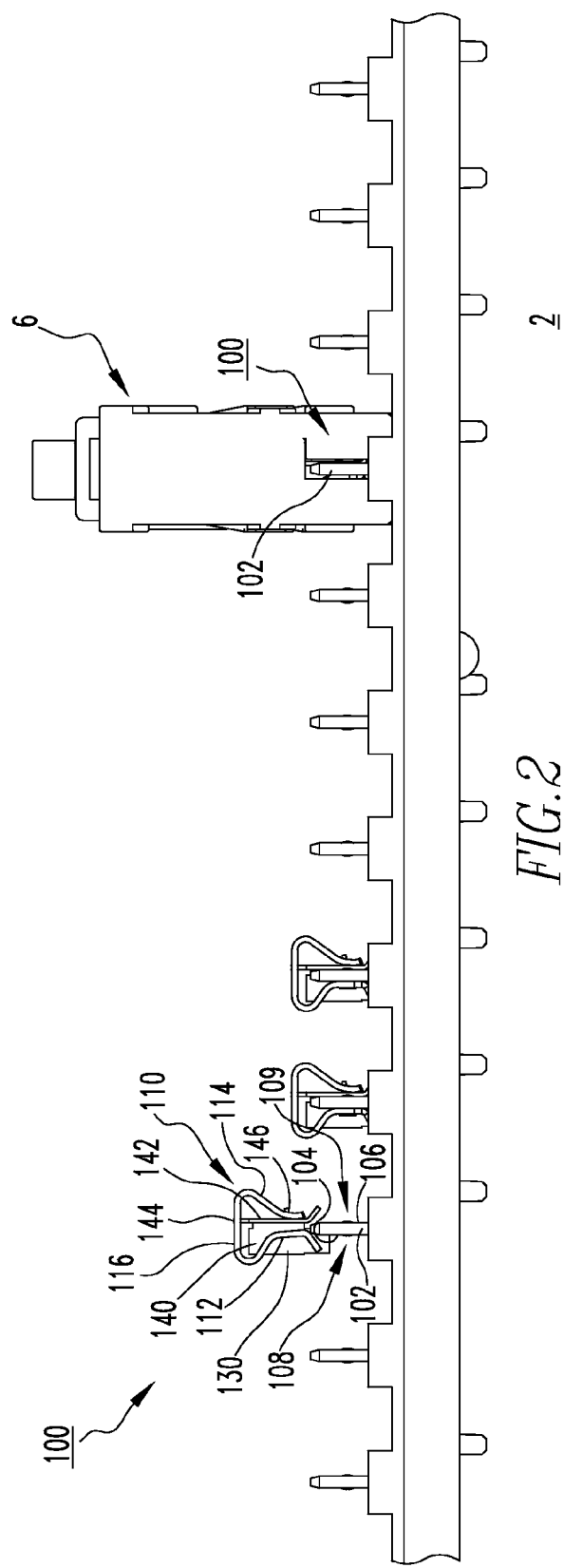
FIG. 2 is an elevation view of the portion of the power distribution system and contact retention assemblies therefor of FIG. 1.
Figure 3:
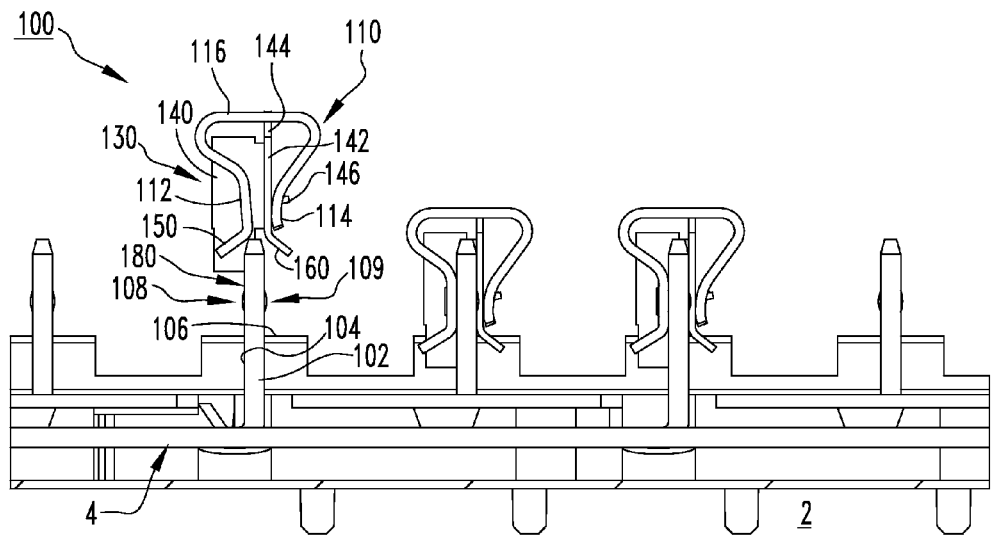
FIG. 3 is a section view taken along line 3-3 of FIG. 1.
Figure 4:
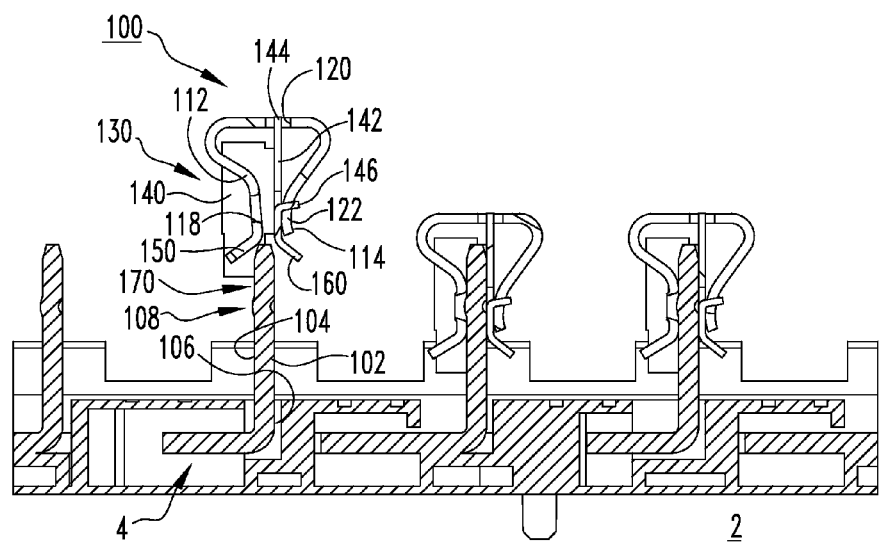
FIG. 4 is a section view taken along line 4-4 of FIG. 1.
Figure 5:
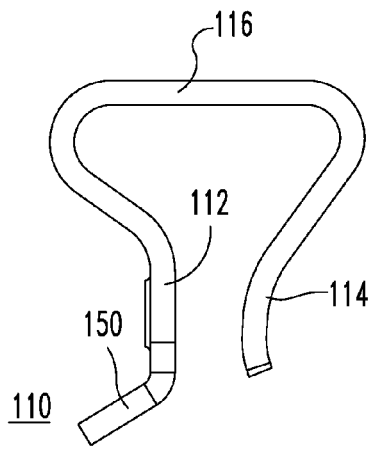
FIG. 5 is an elevation view of the spring member of one of the contact retention assemblies of FIG. 4.
Figure 6:
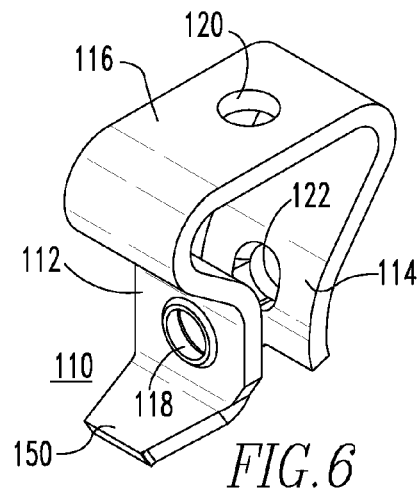
FIGS. 6-9 are isometric views of the spring member of FIG. 5.
Figure 7:
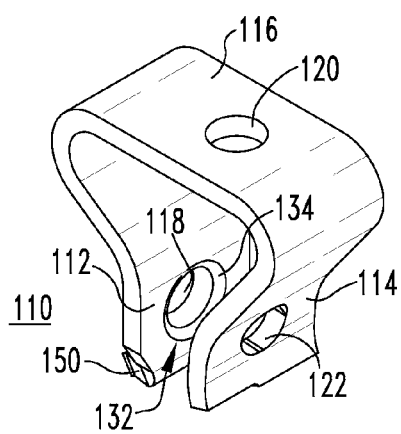

Continuing to refer to FIG. 1, and also to FIGS. 2-4, the contact retention assembly 100 includes a bus stab 102, which extends perpendicularly outwardly from the electrical bus member 4. The bus stab 102 includes first and second opposing sides 104,106, and at least one protrusion 108, which extends outwardly from a corresponding one of the first and second sides 104,106. The contact retention assembly 100 further includes a spring member 110 and a terminal contact 130, which is electrically connected to the circuit breaker 6. The terminal contact 130 is disposed between the bus stab 102 and the spring member 110, as will be further described in detail hereinbelow.

As best shown in FIGS. 5-9, the spring member 110 includes a first leg 112, a second leg 114 disposed opposite the first leg 112, an intermediate portion 116 interconnecting the first and second legs 112,114, and a number of openings 118,120,122 (three are shown). In operation, the first leg 112 of the spring member 110 and the second leg 114 of the spring member 110 are biased toward one another to mechanically couple and electrically connect the terminal contact 130 to the bus stab 102. When the contact retention assembly 100 is fully disposed on the bus stab 102, as shown for example in FIGS. 3 and 4, the aforementioned protrusion 108 of the bus stab 102 is disposed in the opening 118 of the spring member 110. In this manner, the protrusion 108 helps to retain the spring member 110 on the bus stab 102 by preventing or resisting it from undesirably sliding off of the bus stab 102. More specifically, in operation, as the contact retention assembly 100 is slid onto the bus stab 102, the first and second legs 112,114 of the spring member 110 are spread open (i.e., apart; outwardly), and the spring member 110 slides over the bus stab 102 and protrusion 108 thereof until the protrusion 108 engages (i.e., is disposed in), the opening 118 of the spring member 110, as shown. Thus, the spring member 110 is providing a clamping force to the bus stab 102, in order to electrically connect and mechanically couple the terminal contact 130 thereto, and the protrusion 108 cooperates with the hole 118 to provide an increased retention force to resist the assembly from undesirably or unintentionally becoming mechanically and/or electrically disconnected from the bus stab 102.

In the example shown and described herein, the protrusion is a rounded dome 108, which extends outwardly from the first side 104 of the bus stab 102, as best shown in FIGS. 3 and 4. The corresponding opening is a hole 118 extending through the first leg 112 of the spring member 110, wherein the rounded dome 108 is disposed in the hole 118. It will be appreciated, however, that the protrusion 108 could be any known or suitable alternative raised surface or feature (e.g., without limitation, a round nib; a ramp; a square).

Figure 8:
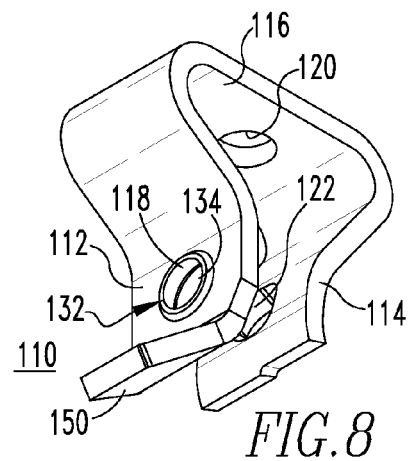
Figure 9:
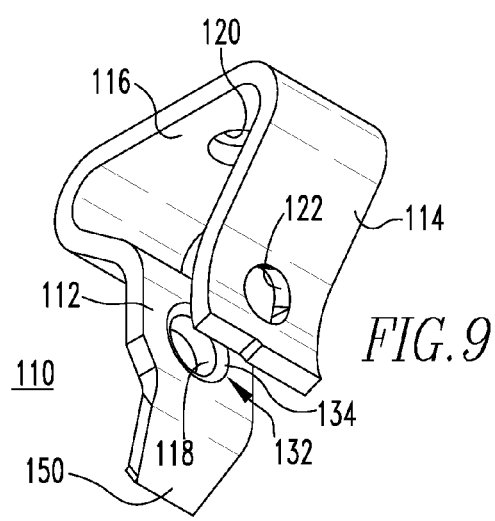

The hole 118 of the example spring member 110 has a circumference 132. An edge 134 extends around the circumference 132, and the edge 134 is preferably rounded or smooth, as best shown in FIGS. 8 and 9. In this manner, the rounded dome 108 can cooperate with the rounded or smooth edge 134 of the hole 118, for example, while avoiding damage to the rounded dome 108 and/or plating (e.g., without limitation copper plating) of the bus stab 102, which could be caused by sharp edges.

Figure 10:
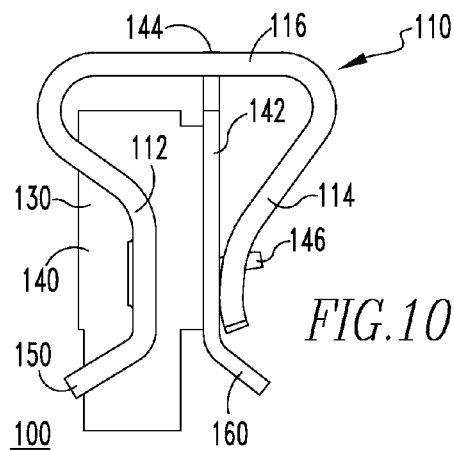
FIG. 10 is an elevation view of one of the contact retention assemblies of FIG. 4.
Figure 11:
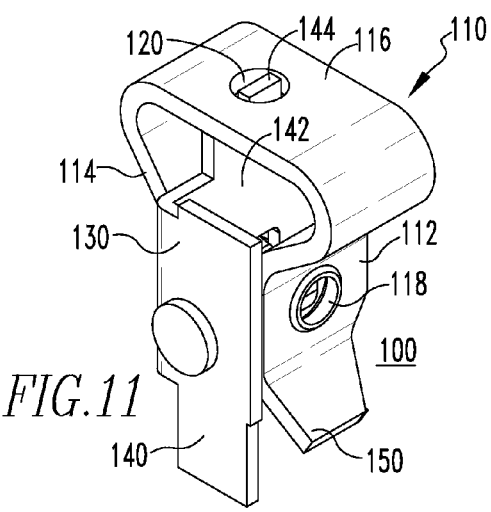
FIGS. 11-14 are isometric views of the contact retention assembly of FIG. 10.
Figure 12:
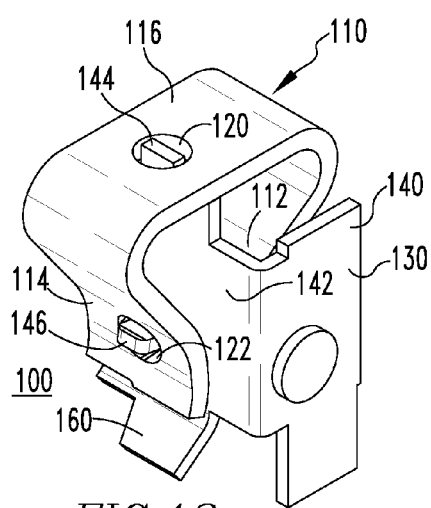
Figure 13:
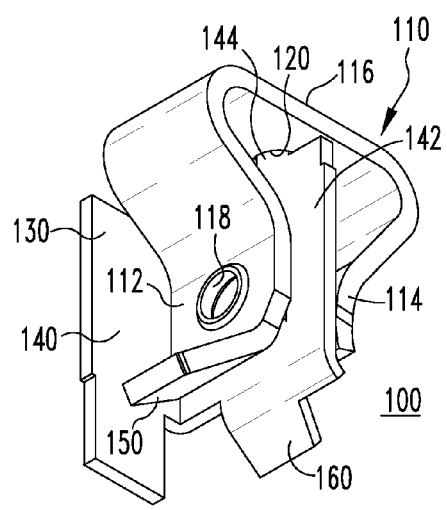
Figure 14:
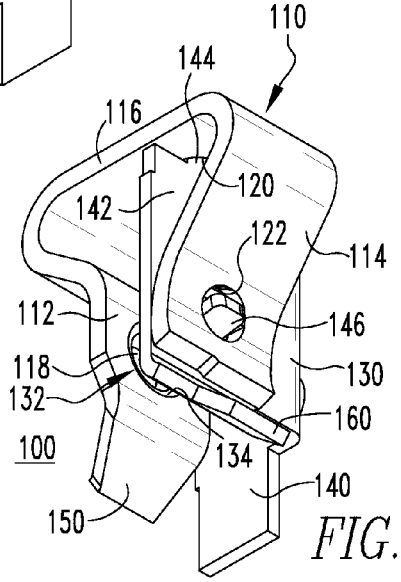

Referring to FIGS. 10-14, the terminal contact 130 of the example retention assembly 100 includes a first portion 140 and a second portion 142. The second portion 142 extends perpendicularly outwardly from the first portion 140. When the contact retention assembly 100 is disposed on the bus stab 102, the second portion 142 is disposed between the second leg 114 of the spring member 100 and the second side 106 of the bus stab 102, as best shown in FIGS. 3 and 4. The terminal contact 130 preferably further includes a first projection 144 and a second projection 146, and the spring member 110 preferably includes three openings, namely a first hole 118, a second hole 120 and a third hole 122. As previously discussed hereinabove, the protrusion or rounded dome 108 of the bus stab 102 is disposed in the first hole 118. The first projection 144 of the terminal contact 130 is disposed in the second hole 120, and the second projection 146 of the terminal contact 130 is disposed in the third hole 122. The first hole 118 is disposed in the first leg 112 of the spring member 110, as shown in FIGS. 11, 13 and 14, and as previously discussed hereinabove. The second hole 120 is disposed in the intermediate portion 116 of the spring member 112, and the third hole 122 is disposed in the second leg 114 of the spring member 110, as shown in FIGS. 12 and 14.

The first projection is preferably a coplanar extension 144 of the second portion 142 of the terminal contact 130. The second projection is preferably a tab 146, which projects laterally outwardly from the second portion 142 of the terminal contact 130, as best shown in FIGS. 10, 12 and 14 (see also FIG. 4).

As shown in FIGS. 2-4 and 10, the first leg 112 of the example spring member 110 further includes an angled portion 150, which extends outwardly away from the first side 104 of the bus stab 102. The second portion 142 of the terminal contact 130 preferably further includes an angled portion 160. Such angled portion 160 of the second portion 142 of the terminal contact 130 extends outwardly away from the second side 106 of the bus stab 102, opposite the angled portion 150 with the first leg 112 of the spring member 110.

Referring again to FIGS. 1, 3 and 4, the bus stab 102 preferably includes a first protrusion 108 and second protrusion 109, wherein the first protrusion 108 extends outwardly from the first side 104 of the bus stab 102, and the second protrusion 109 extends outwardly from the second side 106 of the bus stab 102, as best shown in FIG. 3. The bus stab 102 may include a first stab segment 170 and a second stab segment 180, which is spaced from the first stab segment 170, as best shown in FIG. 1. The first protrusion 108 is preferably disposed on the first side 104 of the first stab segment 170, and the second protrusion 109 is preferably disposed on the second side 106 of the second stab segment 180. Accordingly, it will be appreciated that two circuit breakers 6, or other suitable other electrical apparatus (not shown) can be mechanically coupled and electrically connected to the bus stab 102 in an opposing end-to-end relationship (not expressly shown). In other words, in accordance with one non-limiting example embodiment of the disclosed concept, the power distribution system 2 may incorporate a plurality of electrical switching apparatus, such as the circuit breaker 6 shown in FIG. 1, and employ a plurality of the disclosed contact retention assemblies 100. Specifically, each of the contact retention assemblies 100 is employed to electrically connect and mechanically couple a corresponding one of electrical switching apparatus 6 to a corresponding one of the first stab segment 170 and the second stab segment 180. This will further be appreciated with reference to FIG. 1 wherein a plurality of contact retention assemblies 100 are shown, however, for ease of illustration, the corresponding electrical switching apparatus (e.g., 6) with which the terminal contact (e.g., 130) of each contact retention assembly 100 is electrically connected, has been removed in FIG. 1.

Accordingly, among other benefits, the disclosed contact retention assembly 100 advantageously increases the retention force necessary to maintain the desired electrical connection and mechanical coupling of electrical apparatus (e.g., without limitation, circuit breakers 6) to a corresponding bus stab 102 of a power distribution system 2, by providing a protrusion (e.g., without limitation, rounded dome 108 or other suitable raised surface (not shown)) on the bus stab 102, which is received in a corresponding hole 118 of the spring member 110. Thus, the disclosed concept permits the spring member 110 to be made from a more electrically conductive, but relatively lower strength material, thereby improving system performance by maintaining equal or greater retention force as compared to existing bus stab contact designs (not shown). For example and without limitation, the spring member 110 may be made from copper as opposed to conventional contact spring members (not shown), which are typically made from stainless steel.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A contact retention assembly for electrically connecting an electrical apparatus to an electrical bus member, said contact retention assembly comprising:
   a bus stab structured to extend perpendicularly outwardly from said electrical bus member, said bus stab comprising a first side, a second side disposed opposite the first side, and at least one protrusion extending outwardly from a corresponding one of the first side and the second side;
   a spring member comprising a first leg, a second leg disposed opposite the first leg, an intermediate portion interconnecting the first leg and the second leg, and a number of openings; and
   a terminal contact structured to be electrically connected to said electrical apparatus, said terminal contact being disposed between said bus stab and said spring member,
   wherein the first leg of said spring member and the second leg of said spring member are biased toward one another to mechanically couple and electrically connect said terminal contact to said bus stab, and
   wherein said at least one protrusion of said bus stab is disposed in a corresponding one of said openings of said spring member to retain said spring member on said bus stab.

2. The contact retention assembly of claim 1 wherein said at least one protrusion is a rounded dome extending outwardly from the first side of said bus stab; wherein said corresponding one of said openings is a hole extending through the first leg of said spring member; and wherein said rounded dome is disposed in the hole.

3. The contact retention assembly of claim 2 wherein the hole has a circumference; wherein an edge extends around the circumference; and wherein said edge is rounded or smooth.

4. The contact retention assembly of claim 1 wherein said terminal contact comprises a first portion and a second portion extending perpendicularly outwardly from the first portion; and wherein the second portion is disposed between the second leg of said spring member and the second side of said bus stab.

5. The contact retention assembly of claim 4 wherein said terminal contact further comprises a first projection and a second projection; wherein said number of openings of said spring member is a first hole, a second hole and a third hole; wherein said at least one protrusion of said bus stab is disposed in the first hole; wherein said first projection of said terminal contact is disposed in the second hole; and wherein said second projection of said terminal contact is disposed in the third hole.

6. The contact retention assembly of claim 5 wherein said first hole is disposed in the first leg of said spring member; wherein the second hole is disposed in the intermediate portion of said spring member; and wherein the third hole is disposed in the second leg of said spring member.

7. The contact retention assembly of claim 6 wherein said at least one protrusion is a rounded protrusion extending outwardly from the first side of said bus stab; wherein said first projection is a coplanar extension of the second portion of said terminal contact; and wherein said second projection is a tab projecting laterally outwardly from the second portion of said terminal contact.

8. The contact retention assembly of claim 4 wherein the first leg of said spring member further comprises an angled portion; wherein the angled portion of said spring member extends outwardly away from the first side of said bus stab; wherein the second portion of said terminal contact further comprises an angled portion; and wherein the angled portion of the second portion of said terminal contact extends outwardly away from the second side of said bus stab opposite the angled portion of the first leg of said spring member.

9. The contact retention assembly of claim 1 wherein said at least one protrusion of said bus stab is a first protrusion and a second protrusion; wherein said first protrusion extends outwardly from the first side of said bus stab; and where said second protrusion extends outwardly from the second side of said bus stab.

10. The contact retention assembly of claim 9 wherein said bus stab further comprises a first stab segment and a second stab segment spaced from said first stab segment; wherein said first protrusion is disposed on the first side of said first stab segment; and wherein said second protrusion is disposed on the second side of said second stab segment.

11. A power distribution system comprising:
a number of electrical bus members;
a number of electrical apparatus; and
at least one contact retention assembly for electrically connecting said electrical apparatus to said electrical bus members, said at least one contact retention assembly comprising:
a bus stab extending perpendicularly outwardly from said electrical bus member and comprising a first side, a second side disposed opposite the first side, and at least one protrusion extending outwardly from a corresponding one of the first side and the second side,
a spring member comprising a first leg, a second leg disposed opposite the first leg, an intermediate portion interconnecting the first leg and the second leg, and a number of openings, and
a terminal contact electrically connected to said electrical apparatus and being disposed between said bus stab and said spring member,
wherein the first leg of said spring member and the second leg of said spring member are biased toward one another to mechanically couple and electrically connect said terminal contact to said bus stab, and
wherein said at least one protrusion of said bus stab is disposed in a corresponding one of said openings of said spring member to retain said spring member on said bus stab.

12. The power distribution system of claim 11 wherein said at least one protrusion is a rounded dome extending outwardly from the first side of said bus stab; wherein said corresponding one of said openings is a hole extending through the first leg of said spring member; wherein said rounded dome is disposed in the hole.

13. The power distribution system of claim 12 wherein the hole has a circumference; wherein an edge extends around the circumference; and wherein said edge is rounded or smooth.

14. The power distribution system of claim 11 wherein said terminal contact comprises a first portion and a second portion extending perpendicularly outwardly from the first portion; and wherein the second portion is disposed between the second leg of said spring member and the second side of said bus stab.

15. The power distribution system of claim 14 wherein said terminal contact further comprises a first projection and a second projection; wherein said number of openings of said spring member is a first hole, a second hole and a third hole; wherein said at least one protrusion of said bus stab is disposed in the first hole; wherein said first projection of said terminal contact is disposed in the second hole; and wherein said second projection of said terminal contact is disposed in the third hole.

16. The power distribution system of claim 15 wherein said first hole is disposed in the first leg of said spring member; wherein the second hole is disposed in the intermediate portion of said spring member; and wherein the third hole is disposed in the second leg of said spring member.

17. The power distribution system of claim 16 wherein said at least one protrusion is a rounded protrusion extending outwardly from the first side of said bus stab; wherein said first projection is a coplanar extension of the second portion of said terminal contact; and wherein said second projection is a tab projecting laterally outwardly from the second portion of said terminal contact.

18. The power distribution system of claim 14 wherein the first leg of said spring member further comprises an angled portion; wherein the angled portion of said spring member extends outwardly away from the first side of said bus stab; wherein the second portion of said terminal contact further comprises an angled portion; and wherein the angled portion of the second portion of said terminal contact extends outwardly away from the second side of said bus stab opposite the angled portion of the first leg of said spring member.

19. The power distribution system of claim 11 wherein said at least one protrusion of said bus stab is a first protrusion and a second protrusion; wherein said bus stab further comprises a first stab segment and a second stab segment spaced from said first stab segment; wherein said first protrusion extends outwardly from the first side of said bus stab on said first stab segment; and where said second protrusion extends outwardly from the second side of said bus stab on said second stab segment.

20. The power distribution system of claim 19 wherein said number of electrical apparatus is a plurality of electrical switching apparatus; wherein said at least one contact retention assembly is a plurality of contact retention assemblies; and wherein each of said contact retention assemblies electrically connects and mechanically couples a corresponding one of said electrical switching apparatus to a corresponding one of said first stab segment and said second stab segment.

\* \* \* \* \*